2,806,051

METHOD FOR PREPARING URETHANES BY REACTING UREA, AMINES AND AN ALCOHOL

Charles E. Brockway, Akron, Ohio, assignor to The B. F. Goodrich Company, New York, N. Y., a corporation of New York No Drawing. Application November 1, 1955, Serial No. 544,372

10 Claims. (Cl. 260—471)

This invention relates to a novel method for preparing urethanes and relates more particularly to the preparation of N-substituted urethanes by the reaction of urea, a primary amine and a primary or secondary alcohol.

The urethanes are of commercial interest as chemical intermediates, as herbicides and in pharmaceutical uses, and a rapid inexpensive method of preparing particular N-substituted urethanes in good yield is desirable.

This invention now provides a novel improved method for preparing N-substituted urethanes by the interreaction of urea, a primary amine and primary or secondary alcohol heated together at a temperature greater than about 100° C.

The exact mechanism of the reaction is not completely understood but it is essential, in order to obtain the desired N-substituted urethanes from these reactants, that the reaction be conducted at a temperature greater than about 100° C. and preferably greater than about 120° C. The N-substituted urethanes have the general formula R—NH—CO—OR', wherein R is ordinarily derived from the primary amine and R' is derived from the alcohol.

The primary amine may be any amine of the general formula $RNH_2$ wherein is alkyl, aryl, arylalkyl, alicyclic or heterocyclic. Where R is alkyl it may be methyl, ethyl, propyl, isopropyl, butyl, isobutyl, amyl, isoamyl, octyl, isooctyl, and the like. Where R is aryl the most useful aromatic amines include aniline, chloroanilines, the toluidines, naphthylamine and the like; and arylalkyl amines such as benzyl amine, phenylethylamine, phenylpropylamine and the like. Preferred are primary aryl amines containing 6 to 12 carbon atoms. Mixtures of primary amines may be employed.

The alcohol may be either primary or secondary; and alkyl, alicyclic, heterocyclic or arylalkyl alcohols. When an alkyl alcohol is employed the following are useful and illustrative: methanol, ethanol, propanol-1, propanol-2, butanol-1, 2-methylpropanol-1, butanol-2, pentanol-1, 2-methylbutanol-1, 3-methylbutanol-1, dimethylpropanol, pentanol-2, pentanol-3, 3-methylbutanol-2, hexanol-1, 4-methylpentanol-1, hexanol-2, hexanol-3, 2-ethylhexanol-1, octanol, heptanol, lauryl alcohol and the like. Arylalkyl alcohols include, for example, benzyl alcohol, phenylethyl alcohol, phenylmethyl carbinol, phenylpropyl alcohol and the like. Phenol is not ordinarily considered as an alcohol and does not work in the process of this invention. Other cyclic alcohols such as cyclohexanol, tetrahydrofurfuryl alcohol and the like are also contemplated. Preferred are the alkanols containing 1 to 12 carbon atoms and more preferred are straight-chain primary alkanols containing 4 to 8 carbon atoms. Although secondary alcohols are included within the scope of the invention, better yields are obtained with primary alcohols, while tertiary alcohols do not react in the process of this invention to yield N-substituted urethanes. Mixtures of primary and secondary alcohols may be employed.

The reactions are effected by heating a mixture of the defined amine, alcohol and urea at a temperature above about 100° C. When higher boiling reactants are employed the charges may be simply refluxed for several hours. High reaction temperatures may be employed but it is preferred that the reaction be conducted below about 200° C. A preferred range is between about 120° C. and about 175° C., more preferably between about 125° C. and about 160° C. At the end of the reaction cycle the products are separated by distillation and crystallization as is well known to those skilled in the art. For those combinations of reactants which have low boiling points, pressure reactions, which generally may be autogenous, are required in order that the reaction can be conducted at a temperature greater than about 100° C. The novel method of the invention is applicable to high pressure and continuous as well as batch processes. The reactions may be conducted in the presence of an inert diluent if desired.

Although the ratio of reactants may be varied quite widely, to obtain most favorable yields of the desired N-substituted urethanes, an excess of urea and alcohol are ordinarily employed. The yield of the desired N-substituted urethane will ordinarily be limited by the amount of primary amine employed. A useful ratio of reactants is about 1.0 mole of primary amine, about 1.0 to 2.0 moles of urea and more than 1.0 to as much as 5.0 moles or higher of alcohol. A preferred molar ratio of reactants is 1.0 of amine, 1.2 of urea and 2.0 of alcohol.

As has been pointed out hereinabove the reaction must be conducted at a temperature above 100° C. and preferably above about 120° C., in order to obtain the desired N-substituted urethanes. At reaction temperatures below 100° C., the yield of N-substituted urethane is negligible and substituted ureas are ordinarily a major reaction product. The N-substituted urethanes may be named in several different ways, for example, the reaction product of urea, n-butanol and aniline may be named n-butyl carbanilate, n-butyl phenylurethane or n-butyl N-phenyl carbamate.

The following examples include representative embodiments of this invention:

Example I

A mixture of 93 grams (1.0 mole) of aniline, 72 grams (1.2 moles) of urea, and 148 grams (2.0 moles) of n-butanol is refluxed for 22 hours during which time the temperature gradually rises from 123° C. to 144° C. Ammonia is evolved during the refluxing period. The product is distilled from an Anders flask. A butanol fraction, an aniline fraction, and a third fraction which is impure butyl carbamate are distilled out. The distillation residue is then distilled through a 1 x 8" unpacked column. Distillate comes over at 90–126° C./ca. 1 mm. The distillation is stopped when the pot temperature rises sharply to 170° C. From the distillation residue there is obtained sym-diphenylurea. The distillate crystallizes in the receiver to a pale yellow solid melting at 60–62° C. This solid is taken up in hot hexane. Filtration while hot removes a white powder which is discarded. By cooling the filtrate, the N-substituted urethane product melting at 60–63° C. is obtained. The melting point is not depressed on admixture with authentic n-butyl carbanilate. The total yield of n-butyl carbanilate is 146 grams (0.756 mole, 75.6% of theory calculated on the amount of aniline charged). When this experiment is repeated by reacting at 93–97° C., the sole reaction products are mono- and sym-diphenylurea.

Example II

A mixture of 93 grams (1.0 mole) of aniline, 72 grams (1.2 moles) of urea, and 120 grams (2.0 moles) of isopropanol is charged to a one liter stainless steel autoclave supported in a heating jacket and fitted with an internal stirrer. While the temperature is being raised, the charge is stirred. The temperature is maintained at 140° C. for 32 hours. At intervals the ammonia formed is vented through a reflux condenser. Isopropanol is used to rinse the product into flask for distillation. After removal of isopropanol at atmospheric pressure, a fraction is distilled at 90° C./34 mm. to 88° C./24 mm. Another fraction is then obtained by taking the pot temperature to 160° C. under a pressure of 1 mm. This fraction consists of a solid which collects chiefly in the distilling head. The pot residue is extracted with boiling hexane and filtered while hot. The 1 mm. fraction is extracted with boiling hexane. The hexane extracts on evaporation yield a solid residue which after recrystallization from hexane is identified as isopropyl carbanilate. The total yield of isopropyl carbanilate is 12.6 grams, 0.070 mole (7.0% from aniline). The yield in this case may be increased by higher initial concentration of isopropanol and by steps to decrease loss of the alcohol while venting the ammonia.

*Example III*

A charge of 46.5 grams (0.50 mole) of aniline, 36 grams (0.060 mole) of urea, and 130 grams (1.0 mole) of n-octanol is heated in a round-bottomed flask fitted with thermometer and reflux condenser. The temperature is maintained at 150–160° C. for 13 hours. Ammonia is evolved during the entire heating period. The product is distilled from an Anders flask. Octanol and aniline are removed in a fraction boiling at 56–102° C./20 mm. and a second fraction of unidentified components is taken over at 90–147° C./1.0 mm. The residue, M. P. 56–89° C., is dissolved in warm hexane. After filtering, the hexane solution is cooled and allowed to stand. A deposit of crude n-octyl carbanilate is obtained. After recrystallization from ethanol-water, a yield of 55.3 grams melting at 72–74° C. is obtained. An additional crop, slightly less pure, raises the total yield to 61.5 grams (0.247 mole, 49.4%). The melting point of the product is not depressed by mixing with an authentic sample of n-octyl carbanilate.

*Example IV*

A mixture of 93 grams (1.0 mole) of aniline, 72 grams (1.2 moles) of urea, and 176 grams (2.0 moles) of diethylcarbinol is refluxed for 45 hours. The temperature gradually rises from 120 to 145° C. The cooled product is a slightly turbid yellow-brown liquid. On distillation, the aniline fraction is taken off at a vapor temperature of up to 80° C./6 mm. The next two fractions are respectively, 70–97° C./1.0 mm., and 120–145° C./0.1 mm. The latter fraction is redistilled. A forerun up to 90° C./0.1 mm. is taken off separately, and the main fraction is collected at 90–110° C./0.1 mm. The main fraction is recrystallized from hexane to give 76.8 grams (0.371 moles, 37.1%) of 3-amyl carbanilate.

*Example V*

A mixture of 93 grams (1.0 moles) of aniline, 72 grams (1.2 moles) of urea, and 200 grams (2.0 moles) of cyclohexanol is heated for 53 hours at 140–147° C. Cyclohexanol and aniline are distilled off to a final vapor temperature of 50° C./0.8 mm. The next fraction, cyclohexyl carbamate is taken over at 50–110° C./0.1 mm. The distillation residue is a brown crystalline mass. On recrystallization from ethanol, a first crop of uncertain composition is obtained. A second crop is recrystallized from hexane to give cyclohexyl carbanilate as fine colorless granules weighing 29.7 grams (0.136 mole, 13.6% yield.) Authentic cyclohexyl carbanilate does not depress the melting point of the above product.

*Example VI*

A mixture of 101 grams (1.0 mole) of n-hexylamine, 72 grams (1.2 moles) of urea, and 148 grams (2.0 moles) of n-butanol is refluxed for 49.5 hours. During reflux, the temperature gradually rises from 118 to 138° C. The cooled product is a clear pale yellow solution.

Butanol and hexylamine are removed from the product by vacuum distillation to a vapor temperature of 105° C./10 mm. Another fraction, 70–97° C./0.5 mm. is removed. Continued distillation of the product gives several fractions at 100–125° C./0.5 mm., 170–190° C./0.1 mm., and the residue. The 100–125° C. fraction is redistilled and a center cut boiling at 105° C./0.1–0.2 mm. is collected as product. This product is n-butyl N-n-hexylcarbamate. The product melts at minus 4.5 to minus 3.5° C., has a refractive index ($N_d^{25}$) of 1.4390, and the analysis is as follows:

|  | Calc'd for $C_{11}H_{23}O_2N$ | Found |
| --- | --- | --- |
| Percent carbon | 65.60 | 65.39, 65.25 |
| Percent hydrogen | 6.95 | 7.06, 7.01 |
| Percent nitrogen | 11.53 | 11.38, 11.48 |

The analysis is adequate to identify the product as the butyl N-hexylcarbamate. The yield is 0.195 moles or 19.5% from hexylamine.

From the foregoing description of the invention it will be seen that the interreaction of urea, a primary amine and a primary or secondary alcohol constitutes a new and improved general method for preparing N-substituted urethanes, a widely useful and valuable class of materials. It is apparent, therefore, that various embodiments of the invention in addition to those specifically disclosed may be employed without departing from the spirit and scope of the invention as defined in the appended claims.

I claim:

1. The method for preparing N-substituted urethanes which comprises reacting together a mixture comprising a primary amine, urea and a member of the class consisting of primary and secondary alcohols at a temperature greater than about 100° C. in a molar ratio of one mole of amine, one to two moles of urea and about one to about five moles of alcohol.

2. The method for preparing N-substituted urethanes which comprises reacting together a mixture comprising a primary aromatic amine, urea and a member of the class consisting of primary and secondary alcohols at a temperature greater than about 120° C. in a molar ratio of one mole of amine, one to two moles of urea and more than one to five moles of alcohol.

3. The method for preparing an N-substituted urethane which comprises reacting together a mixture comprising a primary alkyl amine, urea and a member of the class consisting of primary and secondary alcohols at a temperature greater than about 120° C. in a molar ratio of one mole of amine, one to two moles of urea and more than one to five moles of alcohol.

4. The method for preparing N-substituted urethanes which comprises reacting together a mixture comprising a primary aryl amine containing 6 to 12 carbon atoms, urea and a primary alkanol containing 1 to 12 carbon atoms at a temperature of from 120° C. to about 175° C. in a molar ratio of one mole of amine, one to two moles of urea and more than one to five moles of alkanol.

5. The method for preparing an N-phenyl urethane which comprises reacting together a mixture comprising aniline, urea and a primary straight-chain alkanol containing 4 to 8 carbon atoms at a temperature of about 125° C. to about 160° C. in a molar ratio of one mole of amine, one to two moles of urea and more than one to five moles of alkanol.

6. The method of claim 5 wherein the molar ratio of reactants is 1.0 mole of aniline, 1.2 moles of urea and 2.0 moles of alkanol.

7. The method for preparing octyl carbanilate which comprises reacting a mixture comprising 1.0 mole of aniline, about 1.0 to 2.0 moles of urea and about 1.0 to 5.0 moles of n-octanol at a temperature of about 125 to 160° C.

8. The method for preparing n-butyl carbanilate which comprises reacting a mixture comprising 1.0 mole of aniline, about 1.0 to 2.0 moles of urea and about 1.0 to 5.0 moles of n-butanol at a temperature of about 125 to 160° C.

9. The method for preparing isopropyl carbanilate which comprises reacting a mixture comprising 1.0 mole of aniline, about 1.0 to 2.0 moles of urea and about 1.0 to 5.0 moles of isopropanol at a temperature of about 125 to 160° C.

10. The method for preparing isopropyl N(3-chlorophenyl) carbamate which comprises reacting a mixture comprising 1.0 mole of chloroaniline, about 1.0 to 2.0 moles of urea and about 1.0 to 5.0 moles of isopropanol at a temperature of about 125 to 160° C.

References Cited in the file of this patent

UNITED STATES PATENTS 2,677,698    Deutschman et al. -------- May 4, 1954